United States Patent [19]

Gangwisch

[11] 4,171,075
[45] Oct. 16, 1979

[54] DISPENSING AND METERING CONTAINER

[75] Inventor: William J. Gangwisch, New Brunswick, N.J.

[73] Assignee: Colgate-Palmolive Company, New York, N.Y.

[21] Appl. No.: 826,637

[22] Filed: Aug. 22, 1977

[51] Int. Cl.² ............................................. G01F 11/26
[52] U.S. Cl. .................................... 222/456; 222/475
[58] Field of Search ............... 222/456, 455, 454, 475, 222/457.5, 457, 566, 572; 46/1 D, 141

[56] References Cited

U.S. PATENT DOCUMENTS

| 275,419 | 4/1883 | Scott | 222/456 |
|---|---|---|---|
| 2,233,996 | 3/1941 | Dent | 222/456 |
| 3,217,948 | 11/1965 | Mullen | 222/424 |
| 3,396,875 | 8/1968 | Finch | 222/456 |

*Primary Examiner*—Robert J. Spar
*Assistant Examiner*—John P. Shannon
*Attorney, Agent, or Firm*—Strauch, Nolan, Neale, Nies & Kurz

[57] ABSTRACT

A container for dispensing predetermined quantities of fluid comprising a closed end body adapted to contain a supply of fluid with a side wall opening adjacent the top of the body when the container is upright and a hollow combined metering and handle member fixed at one end to the body at the side opening and extending outwardly and downwardly with respect to the body and then upwardly to terminate in a dispensing opening disposed above the level of the body side opening when the container is upright, so that when the container is tilted in one direction from upright position to dispose the body side opening at the underside of the body fluid is displaced from the body to provide a predetermined quantity of fluid in the hollow member and when the container is tilted in the opposite direction from the upright position to dispose the body side opening at the upper side of the container body and the dispensing opening below horizontal all of the fluid will be dispensed from the hollow member while no fluid will enter the hollow member from the body.

7 Claims, 9 Drawing Figures

U.S. Patent  Oct. 16, 1979  4,171,075
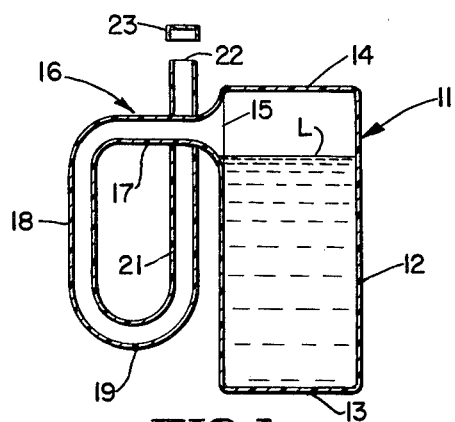
FIG. 1
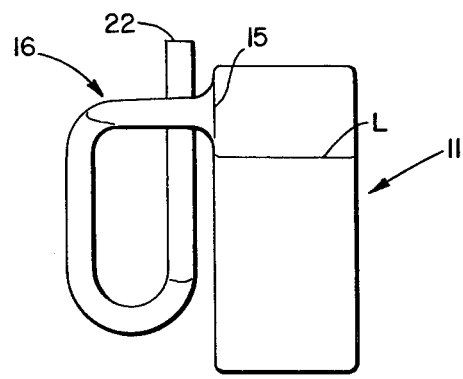
FIG. 4
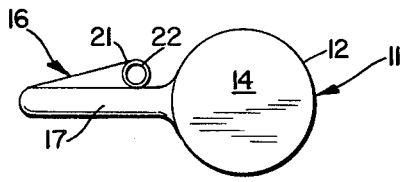
FIG. 2
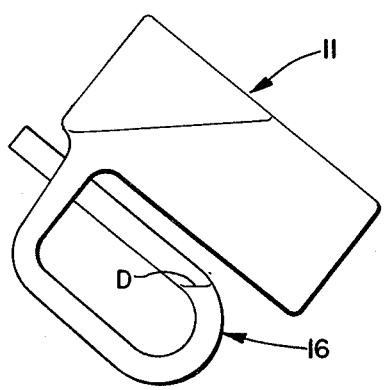
FIG. 3
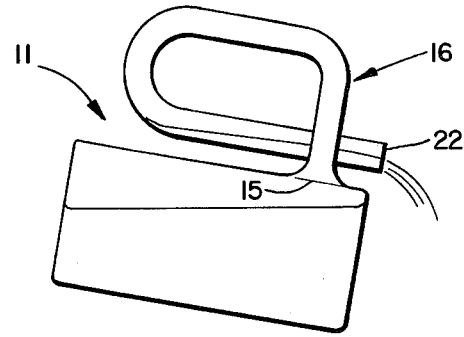
FIG. 5
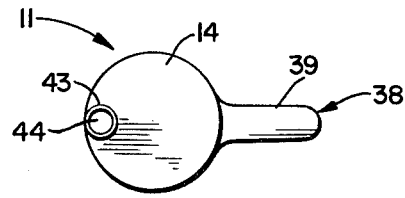
FIG. 9
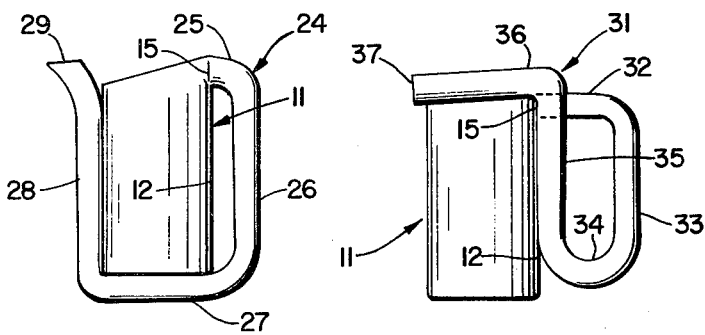
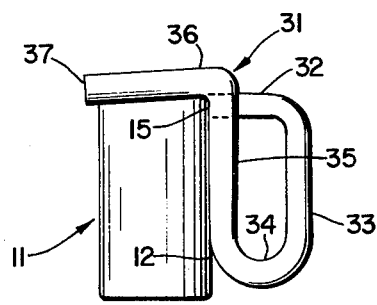
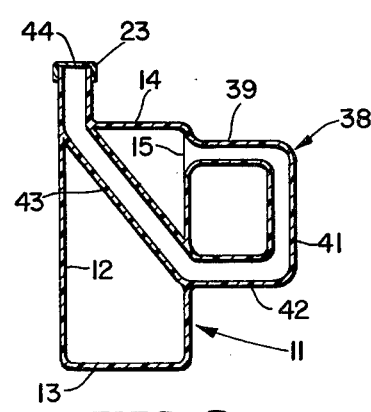
FIG. 6  FIG. 7  FIG. 8

DISPENSING AND METERING CONTAINER

This invention relates to dispensing containers of the type having arrangements for selectively dispensing metered amounts of fluid from a supply in the container body, and particularly to dispensing containers of this type having a hollow handle or like member so constructed and arranged and so connected to the body that when the body is tilted in one direction from upright position only a measured amount of fluid flows into the hollow member and when the body is oppositely tilted only that measured amount of fluid is dispensed from the container through an opening in the hollow member.

It has been proposed to provide dispensing containers wherein amounts of liquid are premeasured in and dispensed from hollow handles, as for example in the U.S. Pat. Nos. 3,217,948 to Mullen and 3,401,840 to McConnell et al. U.S. Pat. No. 3,396,875 to Finch discloses the dispensing of liquid from a container body through a hollow handle into an internal premeasuring chamber in the neck and U.S. Letters Patent to Adams U.S. Pat. Nos. 3,178,081 and Dent No. 2,233,996 are examples of such dispensing containers having internal measuring chambers. In all of these a premeasured quantity of liquid is displaced from a supply into a hollow member or chamber when the container is oriented in one position and only that quantity is dispensed when the container is tilted.

Most of these prior dispensing containers require special or complex construction that adds to expense of manufacture, so that there is a need for a more simple structure that for example can be inexpensively made in one operation by blow molding, and it is an important feature of the present invention to provide this structure.

The major feature of the invention is to provide a closed end container having a hollow member which preferably serves as both a metering chamber and a handle that extends in a loop from a side wall opening in the upper end of the container body to terminate in a dispensing opening above the level of that opening.

Another feature of the invention is to provide a container having means for dispensing predetermined quantities of fluid comprising a closed end body adapted to contain a supply of fluid having a side wall opening adjacent the top of said body when the container is upright and a tubular member which preferably serves as the handle open at one end to said body side opening extending outwardly and downwardly with respect to said body and then upwardly to terminate in a dispensing opening disposed above the level of said body side opening when the container is upright, whereby when said container is tilted in one direction from upright position to dispose said body side opening at the underside of the body fluid is displaced from said body to provide a predetermined quantity of said fluid in said member and when said container is tilted in the opposite direction from said upright position to dispose said body side opening at the upper side of the container body and said dispensing opening below horizontal all of the premeasured fluid will be dispensed from said member while no fluid will enter the hollow member from said body.

Further features of invention will appear in connection with the following description and the attached drawings.

BRIEF DESCRIPTION OF DRAWINGS

FIG. 1 is a side elevation in section showing a metering dispensing container according to one embodiment of the invention;

FIG. 2 is a top plan view of the container of FIG. 1;

FIG. 3 is a side view showing tilting of the container of FIG. 1 in one direction to displace a metered amount of liquid from the container body into the hollow handle;

FIG. 4 is a side view showing the container of FIG. 1 upright after the metered amount of liquid has been transferred to the handle;

FIG. 5 is a side elevation showing the container of FIG. 1 as positioned for dispensing the liquid from the handle;

FIG. 6 is a side elevation showing a further embodiment;

FIG. 7 is a side elevation showing a further embodiment;

FIG. 8 is a side elevation in section showing another embodiment wherein dispensing from the handle takes place through a conduit internally of the container body; and FIG. 9 is a top plan view of the container of FIG. 8.

PREFERRED EMBODIMENTS

The dispensing container of FIGS. 1-5 comprises a body 11 having a cylindrical side wall 12, an integral flat bottom wall 13 and an integral top wall 14. Near the top wall, side wall 12 is formed with an opening 15. A hollow tubular combined metering chamber and handle member 16 extends away from the body at opening 15; consisting in sequence of a straight section 17 one end of which surrounds opening 15, a downwardly extending section 18, section 19 extending back toward the body side wall 12 and an upwardly extending section 21 adjacent the body side wall and terminating in an open end 22 above the level of opening 15 and preferably above the level of top wall 14. A removable friction cap 23 may be provided to close the open end 22.

Tubular section 17 preferably is disposed at about right angles to the axis of body wall 12, and sections 18 and 21 are preferably generally parallel to that axis. Lower section 19 may be straight or curved, and the sections are connected at their adjacent ends by smoothly curved joints. The tubular member 16 is preferably of uniform internal diameter between opening 15 and its open end 22.

Preferably the entire container is an integral formation, although member 16 may be separately formed and joined to the body 12 around opening 15. Also preferably the entire assembly is of transparent glass or plastic, and may be formed by blow molding in a single operation.

Initially the container is charged with a supply of liquid to be dispensed up to a level L standing just below opening 15 when the container is seated upright on bottom wall 13 on a suitable support surface as shown in FIG. 1.

The liquid for filling the body is introduced through opening 22 which is the only opening for the container.

In order to displace liquid from the body into the metering chamber, using member 16 as a handle the container is tilted with cap 23 removed counter clockwise as shown in FIG. 3, so that opening 15 and member 16 are at the underside of the container body but opening 22 is above the horizontal. In this position the liquid in the container body will flow through opening 15 and member 16 until a solid column of liquid is established between opening 15 and a level indicated at D in FIG. 3. This level is determined when the head of the column in member 16 reaches balance against the atmospheric pressure acting on the leading end of the column.

When level D becomes stabilized the container is restored to the upright position as shown in FIG. 4. During this operation some of the liquid in section 17 flows back through opening 15 into the body 12, but the major portion of the liquid remains in the member 16 as shown in FIG. 4. Since the atmospheric pressure acting on the leading end of the column does not change, level D will remain substantially constant and the trailing end of the column will be about level with section 17. Thus, by determining the bore and other dimensions of member 16, a predetermined amount of liquid may be displaced into the member 16 by a simple tilting of the container in one direction.

When it is desired to dispense the premeasured amount of liquid from member 16, using member 16 as the handle the container is tilted in the opposite direction from FIG. 3, to the FIG. 5 position wherein opening 15 and member 16 are at the upper side of body 12 and dispensing opening 22 is below the horizontal. Now all of the liquid in member 16 will flow out of the member. As shown in FIG. 5, the liquid remaining in body 12 does not have access to opening 15 at this time, and only the predetermined quantity that stands in member 16 is disposed.

FIGS. 6-9 show other embodiments.

In FIG. 6 the hollow handle and metering member 24 extends from side opening 15 in the closed end body outwardly in section 25, then downwardly in section 26, back toward the bottom of the body in section 27 and upwardly in section 28 to terminate in a filling and discharge opening at 29 located above the level of opening 15 when the container is upright as shown. The sections 27 and 28 may be free of attachment to body 12 or may be fused thereto.

In FIG. 7 the hollow handle an metering member 31 extends from side opening 15 in the closed end body outwardly in section 32, then downwardly in section 33, back toward the bottom of the body in section 34, upwardly along the body in section 35 to a point at the top of the body, and then across the top of the body in section 36 to terminate in a filling and dispensing opening 37 above the level of opening 15.

In FIGS. 8 and 9 the hollow handle and metering member 38 extends from side opening 15 in the closed end body outwardly in section 39, downwardly in section 41, back toward the body in section 42 and through the interior of the body in section 43 which is inclined upwardly to project through top wall 14 and terminate in an open end 44 above the level of opening 15.

In all of these embodiments the metering chamber portion of the tubular hollow handle is of uniform diameter with its sections connected by smoothly curved transition regions, and the operation is the same as described for FIGS. 1-5. Preferably the hollow member is of uniform bore from the body side wall opening to the dispensing opening at its free end. In each the first section of the tubular handle and measuring member extends at substantially right angles to the container body axis, and when the container is upright the dispensing opening is above the level of body side opening 15. The container is tilted to dispose the body side opening at the lower side to form a column of liquid in the member, turned upright to establish the column and then tilted oppositely to dispose the body side opening at the upper side and the dispensing opening below horizontal for dispensing.

The container of the invention is substantially spill-proof, and is substantially child-proof in view of the selectively small quantity dispensed with each operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A container having means for dispensing predetermined quantities of fluid comprising a body adapted to contain a supply of fluid having closed ends and only a single opening for introduction and discharge of fluid, said opening being a side wall opening adjacent the top of said body when the container is upright and a hollow tubular member extending in a loop laterally outwardly from said body side opening and terminating outside the body in a dispensing opening disposed above the level of said body side opening when the container is upright, whereby when said container is tilted in one direction from upright position to dispose said body side opening at the underside of the body fluid is displaced from said body to provide a predetermined quantity of said fluid in said member and when said container is tilted in the opposite direction from said upright position to dispose said body side opening at the upper side of the container body and said dispensing opening below horizontal all of said fluid in said member will be dispensed from said member while no fluid will enter said member from said body, said tubular member comprising a section extending generally longitudinally of and in spaced relation to said body side wall whereby said loop forms a handle for the container.

2. The container defined in claim 1, wherein said tubular member is of uniform internal cross-section from said side wall opening to said dispensing opening.

3. The container defined in claim 1, wherein said tubular member extends outwardly from the body side wall at said side wall opening, then downwardly and then back toward the body side wall having the side wall opening before extending upwardly to dispose the dispensing opening above said side wall opening.

4. The container defined in claim 3, wherein the upwardly extending portion of said hollow member loop is disposed mainly within said body and projects through the top end wall of said body.

5. The container defined in claim 1, wherein said body and hollow member are integrally formed.

6. The container defined in claim 1, wherein said hollow member loop extends only externally of said body.

7. A container as defined in claim 1, wherein at least part of said loop is transparent.

* * * * *